United States Patent
Tougas et al.

(10) Patent No.: US 12,475,268 B1
(45) Date of Patent: Nov. 18, 2025

(54) PRIVACY MANAGEMENT SYSTEMS AND METHODS FOR USER DEVICES

(71) Applicant: United Services Automobile Association (USAA), San Antonio, TX (US)

(72) Inventors: Brian Tougas, Spring Branch, TX (US); Daniel Scott Veibell, Wylie, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 96 days.

(21) Appl. No.: 18/224,482

(22) Filed: Jul. 20, 2023

Related U.S. Application Data

(60) Provisional application No. 63/391,021, filed on Jul. 21, 2022.

(51) Int. Cl.
  *G06F 21/84* (2013.01)
  *G06V 10/764* (2022.01)
  *G06V 40/10* (2022.01)

(52) U.S. Cl.
  CPC ............ *G06F 21/84* (2013.01); *G06V 10/764* (2022.01); *G06V 40/10* (2022.01)

(58) Field of Classification Search
  CPC ..................................................... G06F 21/84
  See application file for complete search history.

(56) References Cited

U.S. PATENT DOCUMENTS

| | | | |
|---|---|---|---|
| 11,009,728 B2 * | 5/2021 | Hsieh .................... G02F 1/1334 |
| 11,282,174 B1 * | 3/2022 | DeMaio ..................... G06T 5/70 |
| 11,425,335 B2 * | 8/2022 | Lemes da Silva ...... G06F 21/84 |
| 11,463,270 B2 * | 10/2022 | Swierk .................... H04N 23/60 |
| 11,875,514 B2 * | 1/2024 | Warzelhan ............. G06V 20/53 |
| 11,921,886 B2 * | 3/2024 | Amico .................... G06N 20/00 |
| 11,966,486 B2 * | 4/2024 | Mantri .................... G06F 21/84 |
| 2010/0124363 A1 * | 5/2010 | Ek ............................ G06F 21/32 |
| | | | 382/118 |
| 2017/0124349 A1 * | 5/2017 | Anantapur Bache ... G06F 21/44 |
| 2018/0082068 A1 * | 3/2018 | Lancioni ................ G06F 21/84 |
| 2020/0226966 A1 * | 7/2020 | Shin ...................... G09G 3/2003 |
| 2021/0297629 A1 * | 9/2021 | Lemes da Silva .... G06F 18/214 |
| 2023/0206371 A1 * | 6/2023 | Seidlitz ................... G06F 21/10 |
| | | | 705/320 |
| 2024/0005046 A1 * | 1/2024 | Sharma ............... G06F 21/6245 |

* cited by examiner

*Primary Examiner* — Viral S Lakhia
(74) *Attorney, Agent, or Firm* — Fletcher Yoder, P.C.

(57) ABSTRACT

A privacy management system includes a computing system with one or more processors. The privacy management system also includes memory storing instructions executable by the one or more processors to cause the computing system to detect use of an application on a user device operated by a user. The instructions are executable by the one or more processors to cause the computing system to instruct a camera of the user device to capture image data during the use of the application on the user device, and then to analyze the image data to identify a presence of one or more background objects. Further, the instructions are executable by the one or more processors to cause the computing system to initiate one or more privacy actions with respect to information on a display screen of the user device, in response to the presence of the one or more background objects.

17 Claims, 4 Drawing Sheets

PRIVACY MANAGEMENT SYSTEMS AND METHODS FOR USER DEVICES

CROSS-REFERENCE TO RELATED APPLICATION

This application claims the benefit of and priority to U.S. Provisional Patent Application Ser. No. 63/391,021, titled "PRIVACY MANAGEMENT SYSTEMS AND METHODS FOR USER DEVICES," which was filed on Jul. 21, 2022, and which is herein incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admission of prior art.

Information displayed on a user device (e.g., a mobile phone, a tablet, a laptop computer, a smart watch) may include confidential information that a user may wish to keep private. Such confidential information may include personal information, financial information, and/or legal information related to the user. The user may be in a public area in which other users may be able to view a display screen of the user device and/or in which other devices may be able to capture images of the display screen of the user device. In some cases, the user may be unaware of the other users and/or the other devices.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a privacy management system includes a computing system with one or more processors. The privacy management system also includes memory storing instructions executable by the one or more processors to cause the computing system to detect use of an application on a user device operated by a user. The instructions are executable by the one or more processors to cause the computing system to instruct a camera of the user device to capture image data during the use of the application on the user device, and then to analyze the image data to identify a presence of one or more background objects. Further, the instructions are executable by the one or more processors to cause the computing system to initiate one or more privacy actions with respect to information on a display screen of the user device, in response to the presence of the one or more background objects.

In one embodiment, a privacy management system includes a computing system with one or more processors. The privacy management system also includes memory storing instructions executable by the one or more processors to cause the computing system to detect use of an application on a user device operated by a user. The instructions are executable by the one or more processors to cause the computing system to instruct a camera of the user device to capture image data during the use of the application on the user device, and then to analyze the image data to identify a presence of one or more background objects. Further, the instructions are executable by the one or more processors to cause the computing system to reduce a brightness of a display screen of the user device, in response to the presence of the one or more background objects.

In certain embodiments, a method of operating a privacy management system includes detecting, using a computing system, use of an application on a user device operated by a user. The method also includes instructing, using the computing system, a camera of the user device to capture image data during the use of the application on the user device. The method also includes analyzing, using the computing system, the image data to identify a presence of one or more objects. The method also includes initiating, using the computing system and in response to the presence of the one or more objects, one or more privacy actions with respect to information on a display screen of the user device.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
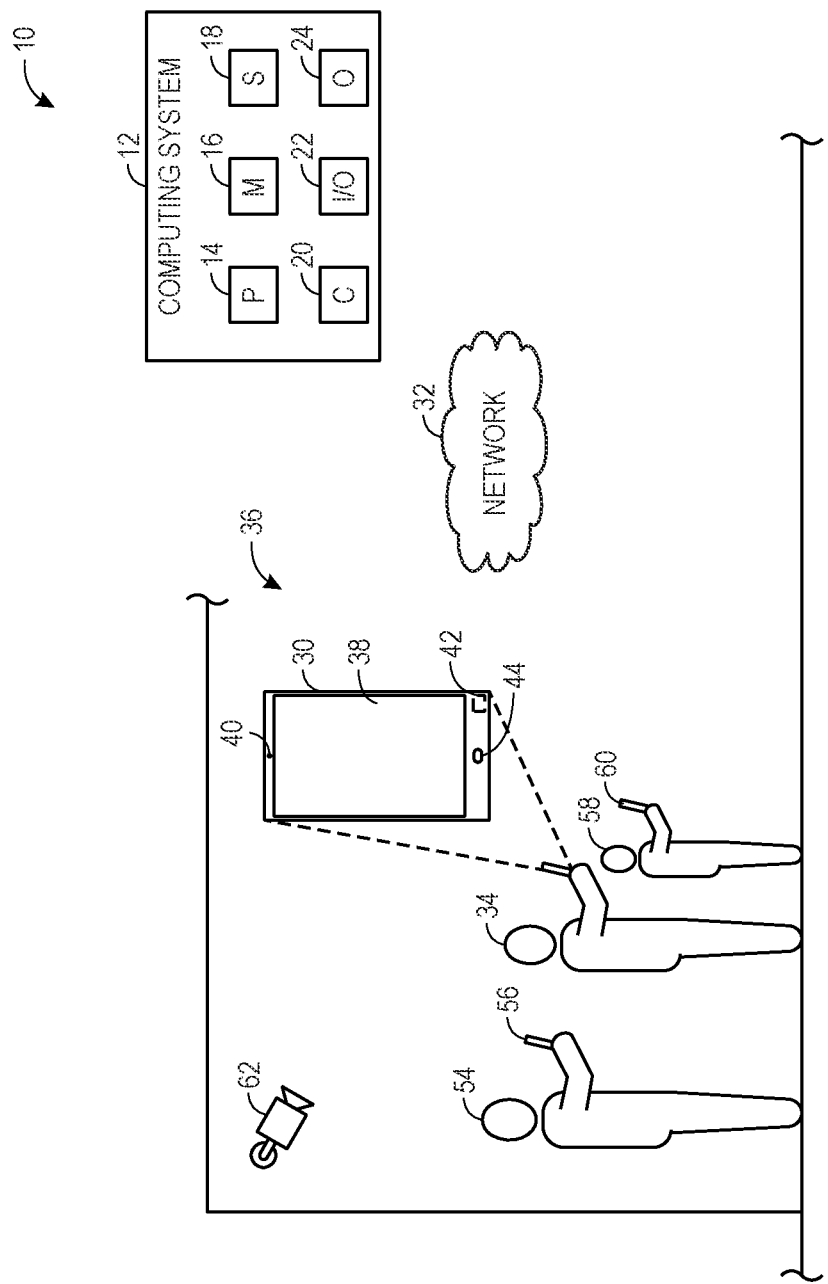
FIG. 1 illustrates a schematic diagram of a privacy management system, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to a privacy management system (e.g., information security system) that blocks (e.g., removes, hides, dims) display of information on a display screen of a user device (e.g., a smart phone, laptop, tablet computer) associated with a user (e.g., person) in response to detection of a background object. More specifically, the privacy management system may block display of the information on the display screen of the user device in response to detection of another user (e.g., another person) that is positioned to visualize the display screen of the user device. Further, the privacy management system may block display of the information on the display screen of the user device in response to detection of another device (e.g., another user device, any camera or imaging device) that is positioned to capture images of the display screen of the user device.

For example, the user may use an application (e.g., a software application) on the user device as the user carries the user device in a public area (e.g., walks along a sidewalk; sits on park bench or on a train). In some cases, the user may use the application to access an account (e.g., a bank account) of the user while in a public area. During this time (e.g., a timeframe in which the user is in the public area), information related to the user may be displayed on the display screen of the user device. At least some of the information may include confidential information, such as personal information, financial information, and/or legal information related to the user. Further, during this time, other users may move about and/or be positioned near the user device (e.g., travel behind the user along the sidewalk; sit behind the user on the train). Further, during this time, other devices may be positioned near the user device (e.g., the user device may pass by a security camera mounted on a building as the user walks along the sidewalk; the user device may be in front of another user device of another user seated on the train).

Accordingly, in some embodiments, the privacy management system may activate (e.g., turn on or initiate a control feature) and/or utilize a camera (e.g., a forward-facing camera or imaging device) of the user device in response to the user opening the application on the user device and/or in response to some other user device action (e.g., the user accessing the account of the user via the application; the user unlocking the user device; the user accessing information via the user device while in the public area). Once activated, the camera may capture images (e.g., image data) that include any background objects (e.g., the other users and/or the other devices) that may be able to observe the display screen of the user device and/or capture screen images of the display screen of the user device.

A computing system of the privacy management system may receive and analyze the images and instruct one or more privacy actions (e.g., security actions) to block display of information on the display screen of the user device in response to detection of any background objects (certain background objects) in the images. The one or more privacy actions may include hiding/removing at least some of the information (e.g., the confidential information) from display on the display screen, dimming the display screen, providing a security alert message on the display screen, and/or providing alternative information on the display screen, for example. The one or more privacy actions may continue until the images are devoid of the background objects or otherwise indicate that the background objects do not pose a privacy issue (e.g., are not positioned to visualize the display screen of the user device and/or capture screen images of the display screen of the user device; are owned by the user, associated with the user, and/or otherwise cleared/approved by the user).

While it should be appreciated that the present embodiments relate to the one or more privacy actions for the information on the display screen, it should be appreciated that the one or more privacy actions may address audio outputs provided via a speaker of the user device. For example, in response to detection of any background objects (certain background objects) in the images, the one or more privacy actions may include lowering a volume and/or muting the speaker of the user device. Accordingly, the privacy management system described herein may render the information (e.g., at least the confidential information) related to the user unavailable (e.g., at least partially illegible and/or inaudible) via the user device in response to detection of any background objects (certain background objects with designated characteristics) in the images. Further, the techniques described herein may be applied to any objects in a vicinity of the user device (e.g., objects within a field of view of one or more cameras, such as a forward-facing camera, a rearward-facing camera, or any other camera on the user device; audio detected by a microphone of the user device and indicative of others speaking in the vicinity of the user device). For example, in response to detection of any forward objects (certain forward objects) in the images, the one or more privacy actions may include lowering a volume and/or muting the speaker of the user device (e.g., and in some case, without adjusting the display screen of the user device since the display screen would not be exposed to any forward objects). Thus, the privacy management system may provide one or more effective, efficient, and automated privacy actions for the user device.

With the foregoing in mind, FIG. 1 illustrates a schematic diagram of a privacy management system 10, in accordance with an embodiment of the present disclosure. The privacy management system 10 may include a computing system 12 that includes a processor 14, a memory device 16, a storage device 18, a communication device 20, input/output (I/O) ports 22, and/or an output device 24. The computing system 12 may be communicatively coupled to one or more user devices, including a user device 30, via a network 32 (e.g., the Internet).

As shown, the user device 30 may be associated with a user 34. The user device 30 may be any suitable type of device (e.g., a mobile phone, a tablet, a laptop computer, and/or a smart watch) to perform the techniques disclosed herein and may be configured to be carried by the user 34 through an environment 36 (e.g., public area; along a sidewalk of a neighborhood or city street; in a physical building, such as a grocery store; in a train or other vehicle). The user device 30 may include a display screen 38, a camera 40, a speaker 42, and/or an input device 44. As shown, the display screen 38 and the camera 40 may be positioned on a front side (e.g., the user device 30 may include a front side and a back side that is opposite the front side) and may face a same direction (e.g., both forward facing). In this way, the camera 40 may include a field of view that allows the camera 40 to capture images of background objects that are positioned to visualize the display screen 38 and/or capture screen images of the display screen 38. For example, the camera 40 may capture images (e.g., image data) of a first additional person 54, a first additional device 56 (e.g., an additional user device), a second additional person 58, a second additional device 60, and/or a third additional device 62 (e.g., security camera). It should be appreciated that the camera 40 may capture images with any number of additional persons and/or additional devices at any given time (e.g., at one time, in one image frame) and/or over time (e.g., at different times, in sequential or separate image frames).

In operation, the user 34 may utilize the user device 30 to carry out different tasks. For example, the user 34 may utilize the user device 30 to use an application (e.g., a software application) on the user device 30 as the user 34 carries the user device 30 in the environment 36. During this time, information related to the user 34 may be displayed on the display screen 38 of the user device 30. At least some of the information may include confidential information, such as personal information, financial information, and/or legal information related to the user 34. The computing system 12 may send instructions to the user device 30 to activate the camera 40 of the user device 30 and/or to transmit the images captured by the camera 40 in response to the application being opened on the user device 30. Additionally or alternatively, the computing system 12 may send instructions to the user device 30 to activate the camera 40 of the user device 30 and/or to transmit the images captured by the camera 40 in response to some other user device action (e.g., the user 34 accessing the account of the user 34 via the application; the user 34 unlocking the user device 30; the user 34 accessing information via the user device 30 while in the environment 36). Once activated, the camera 40 may capture the images that include any background objects (e.g., the first additional person 54, the first additional device 56, and so forth) that may be positioned to visualize the display screen 38 of the user device 30 and/or capture screen images of the display screen 38 of the user device 30. It should be appreciated that the user device 30 and/or the computing system 12 may activate the camera 40 in other ways (e.g., via other control processes and instructions). For example, the user device 30 may activate (e.g., turn on) the camera 40 any time that the user device 30 is turned on, unlocked for use, in use (e.g., receiving inputs or providing outputs, such as displayed or audio outputs), has a camera application (e.g., software application) open, and/or at any other suitable time.

While the information is displayed via the display screen 38 of the user device 30 and/or during use of the application on the user device 30, the images captured by the camera 40 may not be displayed on the display screen 38 of the user device 30. Instead, the camera 40 may capture the images (without displaying locally on the display screen 38 of the user device 30), and the user device 30 may transmit the images to the computing system 12 via the network 32. The computing system 12 may analyze the images to detect presence of any background objects. The computing system 12 may instruct one or more privacy actions (e.g., security actions) in response to detection of any background objects (certain background objects) in the images. The one or more privacy actions may include hiding/removing at least some of the information (e.g., the confidential information) from display on the display screen 38, dimming the display screen 38, providing a security alert message on the display screen 38, and/or providing alternative information on the display screen 38, for example. As noted herein, the one or more privacy actions may include blocking at least some audio output from the speaker 42. The one or more privacy actions may continue until the images are devoid of the background objects or otherwise indicate that the background objects do not pose a privacy issue (e.g., are not positioned to visualize the display screen 38 of the user device 30 and/or capture screen images of the display screen 38 of the user device 30; are owned by the user 34, associated with the user 34, and/or otherwise cleared/approved by the user 34).

In some embodiments, the computing system 12 may be configured to use image recognition techniques to detect (e.g., identify, classify) general categories or types of the background objects, such as to detect that one background object is a person, one background object is a mobile phone, one background object is a security camera, and so forth. The computing system 12 may store, in the storage device 18, a list or a lookup table of target categories (e.g., undesirable types) of the background objects that result in the one or more privacy actions. Thus, whenever the images indicate presence of at least one of the target categories of the background objects, the computing system 12 instructs the one or more privacy actions. It should be appreciated that the computing system 12 may use the image recognition techniques to only detect the target categories of background objects. For example, the computing system 12 may filter out or exclude objects (e.g., trees, furniture, animals) that do not match any of the target categories of background objects and may not categorize such excluded objects, which may reserve processing power and provide improved computer function. Thus, the computing system 12 may categorize and efficiently identify any of the background objects that match any of the target categories of background objects. With reference to FIG. 1, the computing system 12 may categorize and efficiently identify the first additional person 54 as a person, the first additional device 56 as a mobile device, the second additional person 58 as a person, the second additional device 60 as a tablet, and the third additional device 62 as a security camera, for example.

In some embodiments, the computing system 12 may perform such image recognition techniques to categorize and efficiently identify the background objects that match the target categories of background objects without identifying any further information about the background objects. For example, the computing system 12 may not communicate with the background objects, retrieve device identifiers of the background objects, retrieve power/operation status of the background objects, retrieve ownership information about the background objects, and so forth. Such operational features may reserve processing power and provide improved computer function.

However, in some embodiments, the computing system 12 may perform the image recognition techniques to analyze the images captured by the camera 40 and also perform additional operations to obtain more information about the background objects that are in proximity of the user device 30. For example, the computing system 12 may utilize various gaze detection techniques to identify a respective gaze direction for each additional person in the images captured by the camera 40. Then, the computing system 12 may only initiate the one or more privacy actions when the respective gaze direction of at least one additional person is directed at the display screen 38 of the user device 30. As another example, the computing system 12 may utilize various facial recognition techniques to identify a respective face/head orientation for each additional person in the images captured by the camera 40. Then, the computing system 12 may only initiate the one or more privacy actions when the respective face/head orientation of at least one additional person is directed at the display screen 38 of the user device 30. As another example, the computing system 12 may identify an orientation of the additional device, such as to determine whether a camera feature of the additional device is oriented toward the display screen 38 of the user device 30. Then, the computing system 12 may only initiate the one or more privacy actions when the respective orientation of at least one additional device is directed at the display screen 38 of the user device 30.

As another example, in response to detecting one or more additional devices in the images captured by the camera 40, the computing system 12 may utilize various communication techniques to access the device identifiers for the one or more additional devices (which may indicate device characteristics, such as types and features that include cameras and microphones). Such communication techniques may include direct communication with the one or more additional devices via the network 32 and/or indirect communication with the one or more additional devices via the user device 30, which then relays data over the network 32 (e.g., the data may show that a short-range communication connection is established between the user device 30 and the first additional device 56 that has a first device identifier and so forth). Additionally or alternatively, the computing system 12 may utilize the various communication techniques to obtain location information (e.g., global positioning sensor [GPS] system coordinates or proximity data due to short-range communication between devices) for the user device 30 and the one or more additional devices. The computing system 12 may use the device identifiers and/or the location information to determine whether to initiate and/or to maintain the one or more privacy actions. For example, the computing system 12 may not initiate the one or more privacy actions when the device identifiers indicate that all of the background devices are registered to the user 34. As another example, the computing system 12 may only initiate the one or more privacy actions when the device identifiers indicate that at least one of the background devices includes a camera.

Indeed, the privacy management system 10 may enable the user 34 to establish approved additional persons and/or approved additional devices for the user device 30. The privacy management system 10 may enable the user 34 to do this in any of a variety of ways. For example, the privacy management system 10 may enable real-time (e.g., real-time or substantially real-time) approval inputs by the user 34. In such cases, the one or more privacy actions may include a security message that includes at least a portion of the images and/or a prompt to request that the user 34 provide an approval input to indicate approval of some or all of the background objects. With reference to FIG. 1, the security message may include at least the portion of the images with the second additional person 58 and the second additional device 60 and/or the prompt that asks "Do you approve of this user and this device? Select YES or NO." In response to an input of "YES" at the user device 30, the computing system 12 may label or mark the second additional person 58 and/or the second additional device 60 as "APPROVED" and may not instruct the one or more privacy actions in response to presence of the second additional person 58 and the second additional device 60 in the images captured by the camera 40. In response to an input of "NO" at the user device 30, the computing system 12 may label or mark the second additional person 58 and/or the second additional device 60 as "NOT APPROVED" and may instruct the one or more privacy actions in response to presence of the second additional person 58 and the second additional device 60 in the images captured by the camera 40.

Further, this approval process (e.g., real-time approval process; display of at least the portion of the images and/or the prompt) may be triggered in response to certain background objects recurring in the images and/or remaining in the images for more than a threshold period of time (e.g., the second additional person 58 and/or the second additional device 60 appear in the images more than 5 times in one hour and/or remain in the images for more than 10 minutes). In this way, the privacy management system 10 may provide the prompts only for select additional persons and/or additional devices. Further, the privacy management system 10 also efficiently recognizes potentially approved background objects and prompts the user 34 to provide inputs that affect the one or more privacy actions (e.g., allow the user 34 to resume viewing the information on the user device 30 even while the second additional person 58 and/or the second additional device 60 appear in the images). The approval (or disapproval) may extend for any suitable duration, such as for a current session in the application, a fixed time (e.g., 10 minutes), a user-selectable time (e.g., set by the user 34 during the approval process), and/or until the user 34 provides inputs to retract the approval (e.g., via privacy settings accessible via the user device 30, such as in a privacy settings menu presented in the application on the user device 30).

As another example, the privacy management system 10 may provide for prior approval inputs by the user 34 (e.g., during a registration process, via the privacy settings). In such cases, the user 34 may input images of their family members or other users that they would like to include as approved additional persons and/or device identifiers for user devices of their family members or other user devices that they would like to include as approved additional devices. Then, the computing system 12 may store and/or access a list of the approved additional persons and/or the approved additional devices to inform the one or more privacy actions (e.g., not instruct the one or more privacy actions in response to presence of the approved additional persons and the approved additional devices in the images captured by the camera 40). It should be appreciated that the privacy management system 10 may utilize the device identifiers and/or other characteristics (e.g., image recognition) to identify the approved additional devices in the images captured by the camera 40. Further, the privacy management system 10 may utilize image recognition techniques, including facial recognition techniques, to identify the approved additional persons in the images captured by the camera 40. However, as noted herein, the techniques disclosed herein may be carried out without any facial recognition techniques for improved efficiency and/or privacy for all users. It should be appreciated that the computing system 12 may identify the user 34 in the images, such as based on a position of the user 34 in the images (e.g., positioned close to the user device 30) and/or prior approval inputs that approve the user 34.

The computing system 12 includes the processor 14, which may be any type of computer processor or microprocessor capable of executing computer-executable code. Further, the processor 14 may be representative of or include multiple processors that are part of the computing system 12 and that may perform processing operations herein described. The memory device 16 and the storage device 18 may be any suitable article of manufacture that can serve to store processor-executable code, data, or the like. These articles of manufacture may represent computer-readable media (e.g., any suitable form of memory or storage) that may store the processor-executable code used by the processor 14 to perform the presently disclosed techniques. The memory device 16 and the storage device 18 may also store data (e.g., approved additional persons and/or approved additional devices; preferences), various software applications, and the like. It should be noted that non-transitory merely indicates that the media is tangible and not a signal.

The computing system 12 may also include the communication device 20 and the I/O ports 22 that operate to facilitate communication between the computing system 12 and other components of the privacy management system 10. The communication device 20 may facilitate network communications (e.g., wired or wireless). The I/O ports 22 may be interfaces that may communicatively couple to peripheral components, such as input devices (e.g., a keyboard, a mouse, a microphone), sensors, input/output (I/O) modules, output devices, and the like.

The computing system 12 may include the output device 24, which may include a speaker and/or a display screen (e.g., touch screen display) that function to provide relevant information to parties involved in the privacy management process (e.g., a representative of a company that manages the application and/or provides services via the application, such as a banking company and/or an insurance company that provides the account accessed via the application). The display screen may be any suitable type of display screen, such as a liquid crystal display (LCD) screen, plasma display screen, or an organic light emitting diode (OLED) display screen, for example.

It should be noted that the components described herein with regard to the computing system 12 are exemplary components and the computing system 12 may include additional or fewer components relative to what is shown. Additionally, as would be understood, it should be noted that the user device 30 may include components similar to those described as part of the computing system 12, such as a communication device, a processor, a memory device, a storage device, and so forth. While certain operations are described as being performed by the computing system 12 to facilitate discussion, it should be appreciated that the operations may be divided in any suitable manner between the computing system 12, the user device 30 (e.g., local processing on the user device 30), and/or any other suitable computing device having one or more processors. It should also be noted that aspects of the privacy management system 10 may include or work in conjunction with a cloud-based computing system, server, or the like. For example, the computing system 12 may represent a bank of servers and/or a distributed computing system that performs operations disclosed herein (e.g., multiple computing devices that each include one or more processors, and the operations disclosed herein are distributed in any suitable manner between the one or more processors of the multiple computing devices; the multiple computing devices may include the user device 30; as used herein, a computing system may refer to the computing system 12, the user device 30, and/or any other suitable computing device).

Further, as described herein, the one or more privacy actions may be carried out in response to identifying any objects in a vicinity of the user device (e.g., objects within a field of view of one or more cameras, such as the camera 40, a rearward-facing camera, or any other camera on the user device 30; audio detected by a microphone of the user device 30 and indicative of others speaking in the vicinity of the user device 30). For example, in response to detection of any forward objects in the images, the one or more privacy actions may include lowering a volume and/or muting the speaker 42 of the user device 30 (e.g., and in some case, without adjusting the display screen 38 of the user device 30 since the display screen 38 would not be exposed to any forward objects). As another example, in response to detection of any background and/or forward objects in based on the audio detected by the microphone of the user device 30, the one or more privacy actions may include lowering the volume and/or muting the speaker 42 of the user device 30 (e.g., with or without adjusting the display screen 38 of the user device 30).

Figure 2:
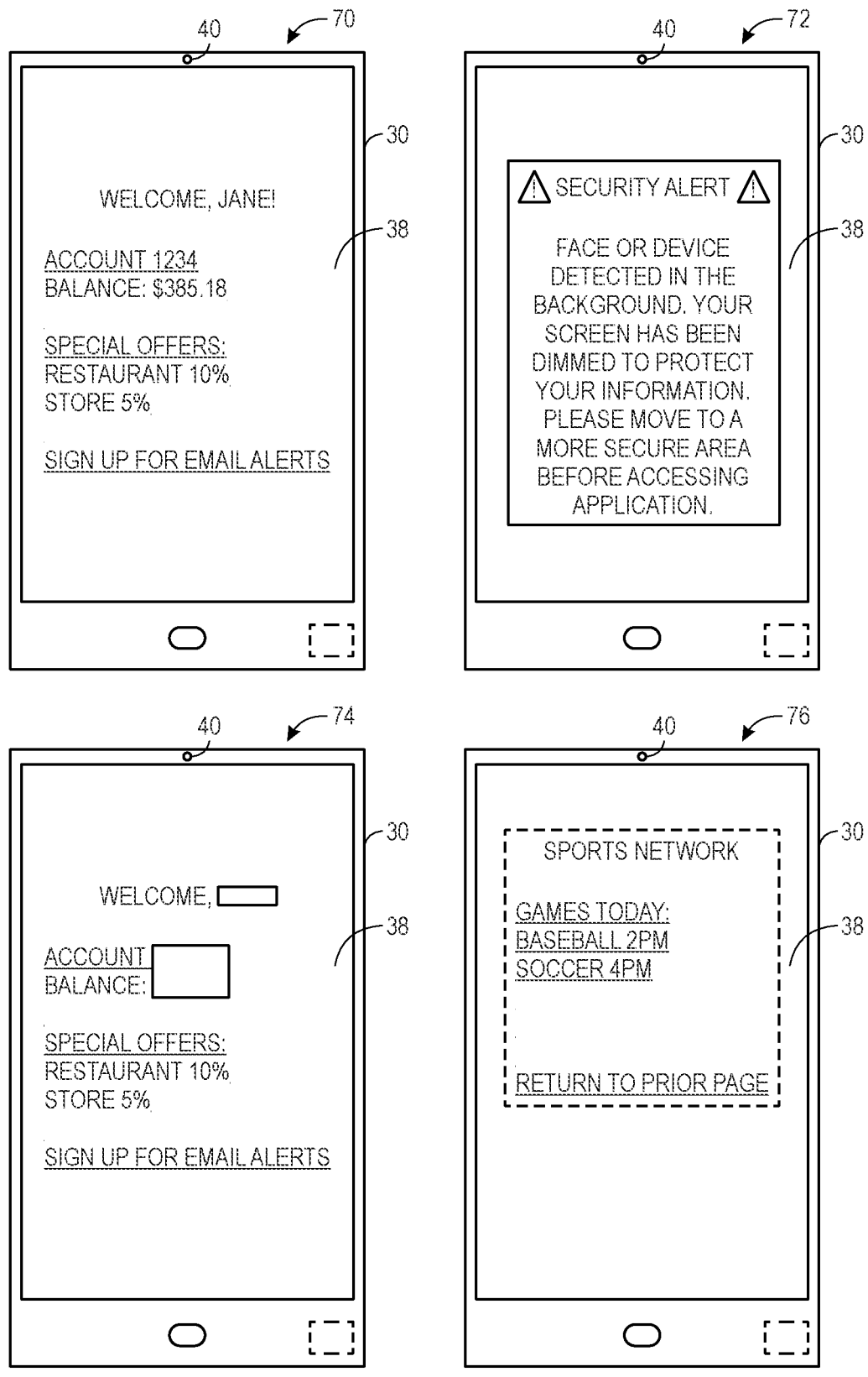
FIG. 2 illustrates a variety of graphical user interfaces (GUIs) that may be generated by the privacy management system of FIG. 1 for display via a user device, in accordance with an embodiment of the present disclosure.

FIG. 2 illustrates a variety of graphical user interfaces (GUIs) that may be generated by the privacy management system 10 of FIG. 1 for display via the user device 30, in accordance with an embodiment of the present disclosure. As shown, a first GUI 70 may be presented upon the user accessing the application on the user device 30. The first GUI 70 may include at least some confidential information, such as a name of the user, an account number of the user, an account balance of the user, and so forth. In some cases, the first GUI 70 may include at least some generic, or non-confidential information, such as special offers for discounts at local establishments and/or selectable links for certain services (e.g., electronic mail alerts). The first GUI 70 may include selectable links and icons that essentially operate like a menu (e.g., upon selection of the account balance, the first GUI 70 may change to present details of deposits and withdrawals for the account and so forth). The user may be permitted to freely navigate to different pages through the application, such as to view the first GUI 70 and/or to view all information via the selectable links and icons. In some cases, the user may only be permitted to view the first GUI 70 and/or to view all of the information when the user device 30 is detected to be within a private area (e.g., not in the environment 36 of FIG. 1 or other public area) and/or without any background objects (or without any unapproved background objects) in images captured by the camera 40.

The privacy management system may activate the camera 40 of the user device 30 and/or receive the images from the camera 40 of the user device 30 in response to the user accessing the application on the user device 30 or at any other suitable time. Prior to displaying the first GUI 70 or prior to displaying information via the application on the user device 30, the privacy management system may provide one or more prompts via the display screen 38 of the user device 30. For example, one prompt may ask the user to provide an input to indicate whether they are in a private area or a public area. As another example, one prompt may ask the user to provide an input to indicate whether they would like to initiate one or more privacy actions (e.g., dim the display screen 38). As another example, one prompt may ask the user to provide an input to approve the activation of the camera 40 and/or the privacy monitoring process during a current session in the application. In such cases, in response to the approval, the privacy management system may activate the camera 40 and/or receive the images from the camera 40 as described herein. However, in response to denial, the privacy management system may not activate the camera 40 and/or may not receive the images from the camera 40 so that user is able to view the information without adjustments from the privacy management system. In this way, the user may maintain control over privacy features employed during the current session in the application. In some embodiments, the user may provide inputs to enable or to disable the privacy management system during the registration process and/or via the privacy settings. In such cases, the privacy management system may cooperate with the user device 30 to provide the privacy features described herein during each session in the application (automatically initiated during each session without input from the user; until the privacy features are disabled in the privacy settings).

In some embodiments, in response to detection of the background objects (certain background objects), the privacy management system may instruct the one or more privacy actions. The one or more privacy actions may include hiding/removing at least some of the information (e.g., the confidential information) from display on the display screen 38, dimming the display screen 38, providing a security alert message on the display screen 38, and/or providing alternative information on the display screen 38, for example. As noted herein, the one or more privacy actions may include blocking at least some audio output from the speaker 42.

Accordingly, to facilitate discussion, FIG. 2 includes a second GUI 72 that provides a security alert message on the display screen 38. The security alert message may include any security details, such as an explanation that a person and/or a device has been detected in a background. The security alert message may also notify the user that the display screen 38 will be dimmed (e.g., screen brightness reduced) and/or that at least some of the information will be hidden/removed from display on the display screen 38 until the user device 30 returns to a more secure area (e.g., the private area and/or the images no longer include the person and/or the device). In some embodiments, the security alert message may only be presented on the display screen 38 for a short time, such as 10 or 15 seconds. Then, the display screen 38 will be dimmed and/or otherwise adjusted (e.g., with at least some of the information blocked from display) until the user device 30 returns to the more secure area. It should also be appreciated that the security message may remain on the display screen 38 until the user device 30 returns to the more secure area.

FIG. 2 also includes a third GUI 74 that illustrates some of the information (that is initially presented in the first GUI 70) being hidden/removed from display on the display screen 38. As shown, only some of the information, such as only the confidential information, may be hidden/removed from display on the display screen 38. However, the generic, or non-confidential information, may continue to be displayed on the display screen 38 for visualization by the user. The user may be able to interact with the third GUI 74 in certain ways, such as to click on or hover over the hidden/removed information (e.g., click on a box hiding the account balance) to view the hidden/removed information. For example, the hidden/removed information may be temporarily displayed in relatively small font (e.g., as compared to the first GUI 70) and/or with other altered characteristics (e.g., reduced brightness in color as compared to the first GUI 70) only while the user touches the display screen 38 over the hidden/removed information. It should be appreciated that the information may be hidden/removed from display on the display screen 38 until the user device 30 returns to the more secure area. It should also be appreciated that the user may not be able to interact with the third GUI 74 to view the hidden/removed information and/or all of the information may be hidden/removed from display on the display screen 38.

FIG. 2 also includes a fourth GUI 76 that provides alternative information (different than the information that is initially presented in the first GUI 70) on the display screen 38. In some embodiments, it may be desirable to display the alternative information so that the background objects are misled or are unable to detect that the user is logged into the application and/or that the user has been viewing the information. This may deter other users from approaching the user to ask for their account number or from stealing the user device 30 with the application open, for example. The alternative information may include any generic, or non-confidential information, such as news, sports, articles, or the like. The alternative information may be an actual website with accurate information (e.g., a website for a local news organization so that the user is redirected from the first GUI 70 and can then navigate through the website) or the alternative information may be a canned image that mimics an actual website. In some embodiments, the alternative information may be presented with visual markers, such as in a dashed line boundary, to alert the user that the alternative information is being presented as part of a privacy management process by the privacy management system 10. The alternative information may include a selectable link to return to a prior page, and the first GUI 70 or the third GUI 74 may be presented upon selection of the selectable link, for example. In some embodiments, the alternative information may be presented after the security alert message that is shown in the second GUI 72. Indeed, it should be appreciated that any of the GUIs 72-76 may be combined and/or used together (e.g., in sequence) in any suitable manner.

Further, in some embodiments, the one or more privacy actions may be selected based on user preferences, which may be input by the user via the privacy settings and/or during the registration process. For example, the user may prefer not to receive the security alert message upon detection of the background objects. Instead, the user may prefer that the display immediately switch to the alternative information. As another example, the user may prefer to receive the security alert message upon detection of the background objects, and then have only certain types of confidential information blocked from display on the display screen 38 while the background objects remain in the images captured by the camera 40. In some embodiments, the privacy management system 10 may select an appropriate privacy action from multiple available privacy actions based on the background objects in the images captured by the camera 40 and/or characteristics of the environment. For example, the privacy management system 10 may block only the confidential information from display on the display screen 38 when the background objects include only security cameras in a store, but may block all information from display on the display screen 38 and/or provide the alternative information when the background objects include multiple additional persons (or at least one additional person gazing at the display screen 38) in a public transit environment.

Figure 3:
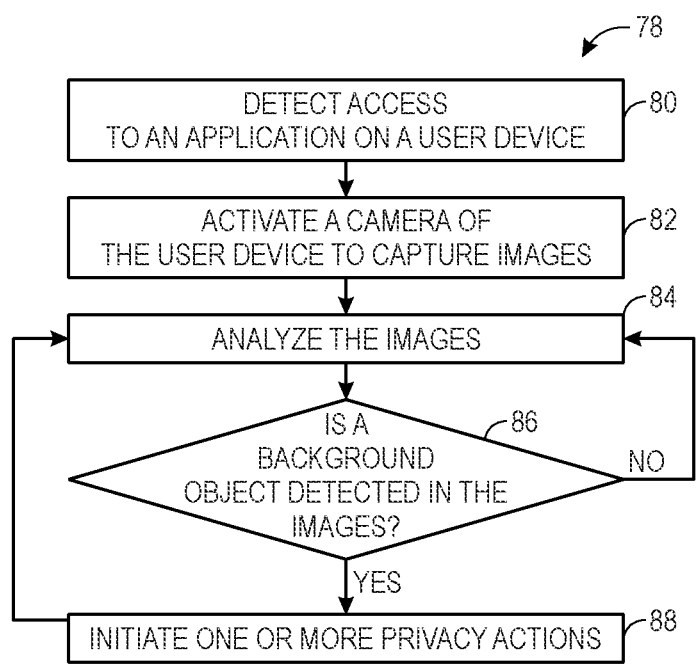
FIG. 3 is a flow diagram of a method of operating a privacy management system to provide privacy actions for a user device, in accordance with an embodiment of the present disclosure.

FIG. 3 is a flow diagram of a method 78 of operating a privacy management system (e.g., the privacy management system 10) to provide privacy display features for a user device (e.g., the user device 30), in accordance with an embodiment of the present disclosure. The following description of the method 78 is described as being performed by a processing system (e.g., the computing system 12 and/or the user device 30), but it should be noted that any suitable processor-based device or system may be specially programmed to perform any of the methods described herein. Moreover, although the following description of the method 78 is described as including certain blocks performed in a particular order, it should be understood that the blocks of the method 78 may be performed in any suitable order, that certain blocks may be omitted, and/or that certain blocks may be added.

In block 80, the processing system may detect access to an application (e.g., a software application) on the user device. For example, the processing system may detect that a user has interacted with the user device to select and/or to open the application on the user device. As another example, the processing system may detect that that the user has interacted with the user device to provide login credentials to access account information via the application, and then the account information may be displayed on a display screen of the user device.

In block 82, in response to detecting the access to the application on the user device, the processing system may activate a camera (e.g., the camera 40) of the user device and/or receive images from the camera of the user device. The camera may be positioned adjacent to and/or face a same direction as a display screen of the user device. In this way, the camera may have a field of view that enables the camera to capture images of background objects that may be able to visualize and/or capture screen images of the display screen of the user device. For example, the camera may capture the images of other users (e.g., people) positioned behind the user and/or facing toward the display screen of the user device (e.g., gazing toward the user device). The camera may also capture the images of other devices (e.g., security cameras, other user devices) positioned behind the user and/or facing toward the display screen of the user device.

In block 84, in response to receipt of the images, the processing system may analyze the images. The processing system may analyze the images to categorize the background objects, such as by using image analysis techniques to determine whether certain objects in the images correspond to (e.g., match) target categories of background objects (e.g., other users, other devices) that should trigger one or more privacy actions.

In block 86, the processing system may determine whether any background objects (certain background objects, such as the target categories of background objects) are detected in the images. If no background objects (or only approved or acceptable background objects) are detected in the images, the method 78 may return to block 84 to continue to receive and analyze new images. However, if background objects (certain background objects, such as the target categories of background objects) are detected in the images, the method 78 may continue to block 88.

In block 88, the processing system may implement or initiate one or more privacy actions. The one or more privacy actions may include hiding/removing at least some of the information (e.g., the confidential information) from display on the display screen of the user device, dimming the display screen of the user device, providing a security alert message on the display screen of the user device, and/or providing alternative information on the display screen on the user device, for example. As noted herein, the one or more privacy actions may include blocking at least some audio output from a speaker of the user device. The one or more privacy actions may continue until the images are devoid of the background objects or otherwise indicate that the background objects do not pose a privacy issue (e.g., are not positioned to visualize the display screen of the user device and/or capture screen images of the display screen of the user device; are owned by the user, associated with the user, and/or otherwise cleared/approved by the user).

Figure 4:
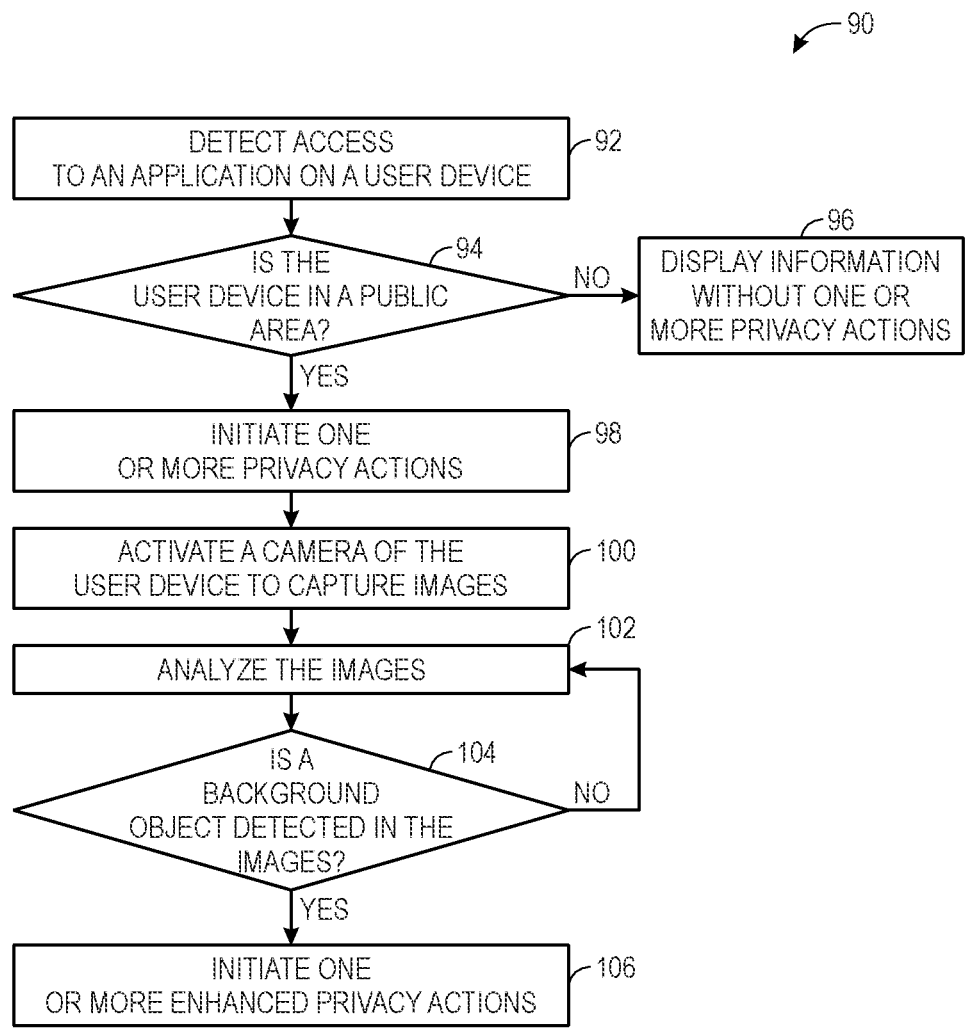
FIG. 4 is a flow diagram of a method of operating a privacy management system to provide multiple levels of privacy actions for a user device, in accordance with an embodiment of the present disclosure.

It should be appreciated that multiple variations of the method 78 are envisioned, including variations that include additional inputs from the user at the user device (e.g., for approval of additional persons and/or additional devices) and so forth. Additionally, certain variations may account for characteristics of an environment. As one example, FIG. 4 is a flow diagram of a method 90 of operating a privacy management system (e.g., the privacy management system 10) to provide multiple levels of privacy features for a user device (e.g., the user device 30), in accordance with an embodiment of the present disclosure. The following description of the method 90 is described as being performed by a processing system (e.g., the computing system 12 and/or the user device 30), but it should be noted that any suitable processor-based device or system may be specially programmed to perform any of the methods described herein. Moreover, although the following description of the method 90 is described as including certain blocks performed in a particular order, it should be understood that the blocks of the method 90 may be performed in any suitable order, that certain blocks may be omitted, and/or that certain blocks may be added.

In block 92, the processing system may detect access to an application (e.g., a software application) on the user device. For example, the processing system may detect that a user has interacted with the user device to select and/or to open the application on the user device. As another example, the processing system may detect that that the user has interacted with the user device to provide login credentials to access account information via the application, and then the account information may be displayed on a display screen of the user device.

In block 94, the processing system may determine whether the user device is in a public area (e.g., other than a residence of a user associated with the user device). The processing system may determine this based on location information provided by a location device (e.g., GPS sensor) of the user device and/or via other techniques (e.g., based on an IP address or a Wi-Fi network associated with the residence). In some embodiments, the processing system may prompt the user to provide an input as to whether the user device is in the public area. If the user device is not in any public area, the method 90 may process to block 96 to display information on the display screen of the user device without one or more privacy actions (e.g., without blocking any of the information). However, if the user device is in the public area, the method 90 may continue to block 98.

In block 98, the processing system may initiate the one or more privacy actions. The one or more privacy actions may be considered to be a first level (e.g., a lower level) and may include hiding/removing at least some of the information (e.g., the confidential information) from display on the display screen of the user device, dimming the display screen of the user device (e.g., to a first brightness level), providing a security alert message on the display screen of the user device (e.g., that the user device is in the public area, that privacy monitoring process will begin), for example. As noted herein, the one or more privacy actions may include blocking at least some audio output from a speaker of the user device. The one or more privacy actions may continue until the user device leaves the public area and/or the location is otherwise determined not to pose a privacy issue (e.g., there are no background objects positioned to visualize the display screen of the user device and/or capture screen images of the display screen of the user device; the location is otherwise cleared/approved by the user).

In block 100, after initiating the one or more privacy actions and in response to detecting the access to the application on the user device, the processing system may activate a camera (e.g., the camera 40) of the user device and/or receive images from the camera of the user device.

The camera may be positioned adjacent to and/or face a same direction as a display screen of the user device. In this way, the camera may have a field of view that enables the camera to capture images of background objects that may be able to visualize and/or capture screen images of the display screen of the user device. For example, the camera may capture the images of other users (e.g., people) positioned behind the user and/or facing toward the display screen of the user device (e.g., gazing toward the user device). The camera may also capture the images of other devices (e.g., security cameras, other user devices) positioned behind the user and/or facing toward the display screen of the user device.

In block 102, in response to receipt of the images, the processing system may analyze the images. The processing system may analyze the images to categorize the background objects, such as by using image analysis techniques to determine whether certain objects in the images correspond to (e.g., match) target categories or types of background objects (e.g., other users, other devices) that should trigger one or more privacy actions.

In block 104, the processing system may determine whether any background objects (certain background objects, such as the target categories of background objects) are detected in the images. If no background objects (or only approved or acceptable background objects) are detected in the images, the method 90 may return to block 102 to continue to receive and analyze new images. However, if background objects (certain background objects, such as the target categories of background objects) are detected in the images, the method 90 may continue to block 106.

In block 106, the processing system may implement or initiate one or more enhanced privacy actions. The one or more enhanced privacy actions may be considered to be a second level (e.g., a higher level) and may include hiding/removing at least some of the information (e.g., additional pieces of the confidential information) from display on the display screen of the user device, dimming the display screen of the user device (e.g., to a second brightness level that is lower/less bright than the first brightness level), providing a security alert message on the display screen of the user device (e.g., that background objects have been detected), and/or providing alternative information on the display screen on the user device, for example. As noted herein, the one or more enhanced privacy actions may include blocking at least some audio output from a speaker of the user device. The one or more enhanced privacy actions may continue until the images are devoid of the background objects or otherwise indicate that the background objects do not pose a privacy issue (e.g., are not positioned to visualize the display screen of the user device and/or capture screen images of the display screen of the user device; are owned by the user, associated with the user, and/or otherwise cleared/approved by the user), or until the user device leaves the public area and/or the location is otherwise determined not to pose a privacy issue.

It should be appreciated that any of the features described herein with respect to FIGS. 1-4 may be combined in any suitable manner. For example, the method 78 of FIG. 3 may also include blocks that include receiving various inputs from the user at the user device. As another example, certain types of background objects may result in corresponding and different levels of privacy actions described in the method 90, such as the first brightness level for persons and the second brightness level for other devices. Further, other factors may be considered in the initiation of and/or the level of the privacy actions, such as an estimated distance (e.g., based on analysis of the image data and/or communication signal strength) between the user device and the one or more background objects. While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform) ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A privacy management system, comprising:
   a computing system comprising one or more processors; and
   memory storing instructions executable by the one or more processors to cause the computing system to:
   monitor a location of a user device;
   detect use of an application on the user device by a user;
   in response to the location of the user device corresponding to a public area during the use of the application on the user device, initiate a first privacy action of one or more privacy actions with respect to information on a display screen of the user device and instruct a camera of the user device to capture image data during the use of the application on the user device;
   analyze the image data to detect a presence of one or more background objects and determine whether the one or more background objects correspond to one or more target object types;
   in response to detecting the presence of the one or more background objects that correspond to the one or more target object types, initiate a second privacy action of the one or more privacy actions with respect to the information on the display screen of the user device;
   display a prompt to request user input of approval or disapproval of the one or more background objects; and
   end at least the second privacy action of the one or more privacy actions in response to receipt of the user input of approval of the one or more background objects.

2. The privacy management system of claim 1, wherein the one or more background objects that correspond to the one or more target object types comprise one or more additional persons.

3. The privacy management system of claim 1, wherein the one or more background objects that correspond to the one or more target object types comprise one or more additional devices.

4. The privacy management system of claim 1, wherein the one or more privacy actions comprise display of a security message that indicates the presence of the one or more background objects that correspond to the one or more target object types.

5. The privacy management system of claim 1, wherein the one or more privacy actions comprise display of alternative information on the display screen of the user device.

6. The privacy management system of claim 1, wherein the one or more privacy actions comprise reducing a brightness of the display screen of the user device.

7. The privacy management system of claim 1, wherein the instructions are executable by the one or more processors to cause the computing system to:
set a brightness of the display screen based on the location of the user device.

8. The privacy management system of claim 1, wherein the image data is not displayed on the display screen of the user device during the use of the application on the user device.

9. A privacy management system, comprising:
a computing system comprising one or more processors; and
memory storing instructions executable by the one or more processors to cause the computing system to:
monitor a location of a user device;
detect use of an application on the user device;
in response to the location of the user device corresponding to a public area during the use of the application on the user device, initiate a first privacy action of one or more privacy actions with respect to information on a display screen of the user device and instruct a camera of the user device to capture image data during the use of the application on the user device;
analyze the image data to identify a presence of one or more background objects;
in response to the presence of the one or more background objects, initiate a second privacy action of the one or more privacy actions, wherein the second privacy action of the one or more privacy actions comprises reducing a brightness of the display screen of the user device;
display a prompt to request user input of approval or disapproval of the one or more background objects; and
end at least the second privacy action of the one or more privacy actions in response to receipt of the user input of approval of the one or more background objects.

10. The privacy management system of claim 9, wherein the instructions are executable by the one or more processors to cause the computing system to determine a type of the one or more background objects.

11. The privacy management system of claim 10, wherein the instructions are executable by the one or more processors to cause the computing system to initiate the second privacy action of the one or more privacy actions in response to determining that the type of the one or more background objects corresponds to one or more target object types.

12. The privacy management system of claim 9, wherein the instructions are executable by the one or more processors to cause the computing system to initiate one or more additional privacy actions with respect to information on the display screen of the user device, and the one or more additional privacy actions comprise display of alternative information on the display screen of the user device, display of a security message that indicates the presence of the one or more background objects, or both.

13. The privacy management system of claim 9, wherein the instructions are executable by the one or more processors to cause the computing system to:
in response to the location of the user device corresponding to the public area during the use of the application on the user device, initiate the first privacy action of the one or more privacy actions to reduce the brightness of the display screen to a first level and instruct the camera of the user device to capture the image data during the use of the application on the user device; and
in response to the presence of the one or more background objects, initiate the second privacy action of the one or more privacy actions to reduce the brightness of the display screen to a second level that is lower than the first level.

14. The privacy management system of claim 9, wherein the image data is not displayed on the display screen of the user device during the use of the application on the user device.

15. A method of operating a privacy management system, the method comprising:
monitoring, using a computing system, a location of a user device;
detecting, using the computing system, use of an application on the user device by a user;
in response to the location of the user device corresponding to a public area during the use of the application on the user device:
initiating, using the computing system, a first privacy action of one or more privacy actions with respect to information on a display screen of the user device;
instructing, using the computing system, a camera of the user device to capture image data during the use of the application on the user device; and
analyzing, using the computing system, the image data to identify a presence of one or more objects;
in response to the presence of the one or more objects:
initiating, using the computing system, a second privacy action of the one or more privacy actions with respect to the information on the display screen of the user device;
displaying, using the computing system, a prompt to request user input of approval or disapproval of the one or more objects; and
ending, using the computing system, at least the second privacy action of the one or more privacy actions in response to receipt of the user input of approval of the one or more objects.

16. The method of claim 15, wherein the one or more privacy actions comprise reducing a brightness of the display screen of the user device.

17. The privacy management system of claim 1, wherein the instructions are executable by the one or more processors to cause the computing system to instruct the camera of the user device to capture the image data during the use of the application on the user device by activating the camera of the user device to capture the image data in response to the user accessing an account via the application.

* * * * *